United States Patent
Duncan et al.

(10) Patent No.: US 7,685,371 B1
(45) Date of Patent: Mar. 23, 2010

(54) HIERARCHICAL FLUSH BARRIER MECHANISM WITH DEADLOCK AVOIDANCE

(75) Inventors: Samuel Hammond Duncan, Arlington, MA (US); Robert A. Alfieri, Chapel Hill, NC (US); John H. Edmondson, Arlington, MA (US); David William Nuechterlein, Longmont, CO (US); Michael A. Woodmansee, Lighthouse Point, FL (US)

(73) Assignee: NVIDIA Corporation, Santa Clara, CA (US)

( * ) Notice: Subject to any disclaimer, the term of this patent is extended or adjusted under 35 U.S.C. 154(b) by 1008 days.

(21) Appl. No.: 11/406,550

(22) Filed: Apr. 19, 2006

(51) Int. Cl.
*G06F 12/00* (2006.01)
*G06F 13/00* (2006.01)
*G06F 13/28* (2006.01)

(52) U.S. Cl. .................. 711/135; 711/159; 345/541
(58) Field of Classification Search .................. None
See application file for complete search history.

(56) References Cited

U.S. PATENT DOCUMENTS

| | | | | |
|---|---|---|---|---|
| 5,864,657 A * | 1/1999 | Stiffler | ............... | 714/15 |
| 5,915,104 A * | 6/1999 | Miller | ............... | 710/310 |
| 5,948,081 A * | 9/1999 | Foster | ............... | 710/40 |
| 6,150,599 A * | 11/2000 | Fay et al. | ............... | 84/609 |
| 6,553,430 B1 * | 4/2003 | Keller | ............... | 710/5 |
| 6,681,293 B1 * | 1/2004 | Solomon et al. | ........... | 711/122 |
| 6,938,113 B2 * | 8/2005 | Stuber et al. | ............... | 710/110 |
| 7,194,587 B2 * | 3/2007 | McCalpin et al. | ........... | 711/144 |
| 7,194,603 B2 * | 3/2007 | Burky et al. | ............... | 712/216 |
| 2001/0049771 A1 * | 12/2001 | Tischler et al. | ........... | 711/133 |
| 2003/0172316 A1 * | 9/2003 | Tremblay et al. | ........... | 714/7 |
| 2003/0200373 A1 * | 10/2003 | Kent | ............... | 710/305 |
| 2003/0217209 A1 * | 11/2003 | Stuber et al. | ............... | 710/200 |
| 2004/0111557 A1 * | 6/2004 | Nakatani et al. | ........... | 711/113 |
| 2004/0208066 A1 * | 10/2004 | Burky et al. | ............... | 365/200 |
| 2004/0215938 A1 * | 10/2004 | Burky et al. | ............... | 712/218 |
| 2005/0160210 A1 * | 7/2005 | Watt et al. | ............... | 710/269 |
| 2005/0235067 A1 * | 10/2005 | Creta et al. | ............... | 710/5 |
| 2006/0155966 A1 * | 7/2006 | Burky et al. | ............... | 712/218 |
| 2006/0232590 A1 * | 10/2006 | Bakalash et al. | ........... | 345/502 |
| 2006/0288130 A1 * | 12/2006 | Madukkarumukumana et al. | ........... | 710/22 |
| 2007/0180196 A1 * | 8/2007 | Guthrie et al. | ........... | 711/141 |
| 2008/0046655 A1 * | 2/2008 | Bhanoo et al. | ........... | 711/133 |

* cited by examiner

*Primary Examiner*—Matt Kim
*Assistant Examiner*—Matthew R Chrzanowski
(74) *Attorney, Agent, or Firm*—Townsend and Townsend and Crew LLP (57) ABSTRACT

A data processing system can establish or maintain data coherency by issuing a data flush operation. The data processing system can be configured as a host executing one or more independent processes using one or more lower level devices. The lower level devices can be viewed as peer devices. Any of the host or the plurality of peer devices can be configured to initiate the flush operation. A device can determine whether the initiator of a flush operation is the host or a peer device. The device can perform a flush limited to local memory, or a subset of all available memory, if a peer device initiates the flush operation.

11 Claims, 4 Drawing Sheets

HIERARCHICAL FLUSH BARRIER MECHANISM WITH DEADLOCK AVOIDANCE

BACKGROUND OF THE INVENTION

Data processing systems having multiple storage devices and memory partitions can have the ability to concurrently execute multiple independent processes. A controller can dynamically allocate portions of memory to each individual process. The controller can allocate and release the memory as required by the processes. Because processing of data for the various independent processes can occur in a distributed manner and utilize many logical memory blocks, the system needs a manner in which the data can be made coherent or otherwise consistent across the various frames of reference in the processing system.

One way in which the data can be made coherent is to allow each individual process to independently flush all memory locations. During a flush operation, all processes can be made to stall while the flush completes. Additionally, the processing system may limit the ability to initiate flush operations by locking access to the flush mechanism once one process takes control of it.

Interlocking of the flush mechanism is an inefficient manner of ensuring data coherency, multiple processes can be stalled unnecessarily while waiting for their turn to access the flush mechanism. Serially initiating an independent flush mechanism for each independent process can also produce a large latency for each flush.

As data processing systems become more complex, the need to maintain data coherency across multiple independent processes will become an increasingly common situation. Each of the multiple independent processes appears as an independent launcher of a data coherency mechanism.

BRIEF SUMMARY OF THE INVENTION

A data processing system can establish or maintain data coherency by issuing a data flush operation. The data processing system can be configured as a host executing one or more independent processes using one or more lower level devices. The lower level devices can be viewed as peer devices. Any of the host or the plurality of peer devices can be configured to initiate the flush operation. A device can determine whether the initiator of a flush operation is the host or a peer device. The device can perform a flush limited to local memory, or a subset of all available memory, if a peer device initiates the flush operation.

Aspects of the invention include a method of performing memory flush operations in a system having host and peer devices. The method includes receiving a flush command, determining a source of the flush command, and performing a flush operation on a subset of memory locations based on the source.

Aspects of the invention include a method of performing memory flush operations in a system having host and peer devices. The method includes receiving a flush operation command, determining whether the flush operation command initiated at a peer device, initiating a memory flush of a subset of available memory locations if the flush operation command initiated in a peer device, and acknowledging completion of the memory flush.

Aspects of the invention include a system having a plurality of memory flush mechanisms that includes a host device configured to selectively generate a host flush command, a first peer device configured to selectively generate a peer flush command, and a second peer device configured to receive a flush command, determine if a source of the flush command corresponds to the host or the first peer, and initiate one of the plurality of memory flush mechanisms based at least in part on the determination of the source.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

A data processing system can implement a plurality of data storage devices distributed across one or more devices. The system can be configured to dynamically allocate memory in each of the plurality of storage devices. The system can be configured to execute a plurality of independent processes and can allocate memory from each of the storage devices for each of the independent processes. Thus, each storage device can have portions of memory allocated to different processes.

The system can use a logical memory map to track the dynamic allocation and release of memory from each of the storage devices. The system can update the logical memory map as storage is allocated or released from a process. The system can process the data for each of the independent processes using a distributed architecture, where independent processors can concurrently operate on different sub-processes or different portions of the same process.

Each of the processors in a distributed architecture can implement a pipelined structure that can load numerous instructions into a pipeline for execution. Some of the sub-processes may allow for instruction execution in an optimized manner that is not limited to the order in which the instructions are presented to the processor.

Therefore, the system may concurrently execute multiple independent processes, each of which may be distributed across multiple processors using pipelined or otherwise optimized instruction scheduling. The system needs to ensure that the data is coherent or otherwise consistent for all frames of reference in some instances. For example, the system may ensure data coherency before updating the logical memory map. The system needs to ensure that pending writes to memory are complete before initiating the update. The system can implement a data flush mechanism to ensure that all frames of reference for data are coherent or otherwise consistent.

Because the system can concurrently execute multiple independent processes, each process typically has no ability to predict when another process will initiate a data flush operation. The system can be configured to allow each of the multiple processors to initiate a flush operation.

The system can be configured as a host executing multiple independent processes. The host can execute a sub-process or portion of a process in a client or lower level device that is controlled by the host.

Multiple clients or devices controlled by the host can be considered as peer devices, or simply, peers. There can be multiple peer levels, and the peer levels can be arranged in a hierarchy, with the host at the top of the hierarchy. Some devices at the same peer level may have no lower level, while other peer levels may have one or more lower levels.

Within any particular peer level, no one device may be considered as the controller or host of the other peers. In one embodiment, each of a plurality of peer devices can include a processor that is configured to execute an independent portion of a host process, or independent portions of independent host processes.

Each processor in a peer device may be configured to access memory at any of the multiple storage devices. A processor on a first peer device can access, for example, system memory, memory local to the first peer device, or memory local to a second peer device. The peer processor may need to initiate a flush operation as it processes or completes processing of a particular portion of the host process.

However, a peer initiated flush operation may create a deadlock condition. For example, a first peer device may initiate a flush operation by writing an instruction to a flush register. The first peer device can determine that the flush operation is complete by reading from a status register or from a memory location that is made coherent by the flush operation. The flush operation may be configured to direct all processes, whether peer or host initiated, to complete any write operations to memory. In response to the flush operation, a second peer device may be directed to initiate a flush operation in which it attempts to write to a flush register in the first peer device and read from a memory location affected by the flush operation.

However, the flush operation initiated by the first peer device cannot complete because the write by the second peer device will not complete until the first flush operation has completed. Yet, the first flush operation will not complete until the write by the second peer device initiated by the first flush operation completes. Thus, a deadlock situation can persist due to a circular dependency.

In order to alleviate the possible deadlock situation, a device can examine a flush operation to determine if it was initiated by the host or by a peer device having memory that can be flushed. A flush operation initiated by a peer device that has memory can be treated as an instruction to perform a local flush operation. That is, the second peer device will only initiate a flush of memory that is local to the second peer device when it receives a peer initiated flush. A flush operation initiated by the host is treated as a flush of all memory locations, whether system memory or peer memory.

Figure 1:
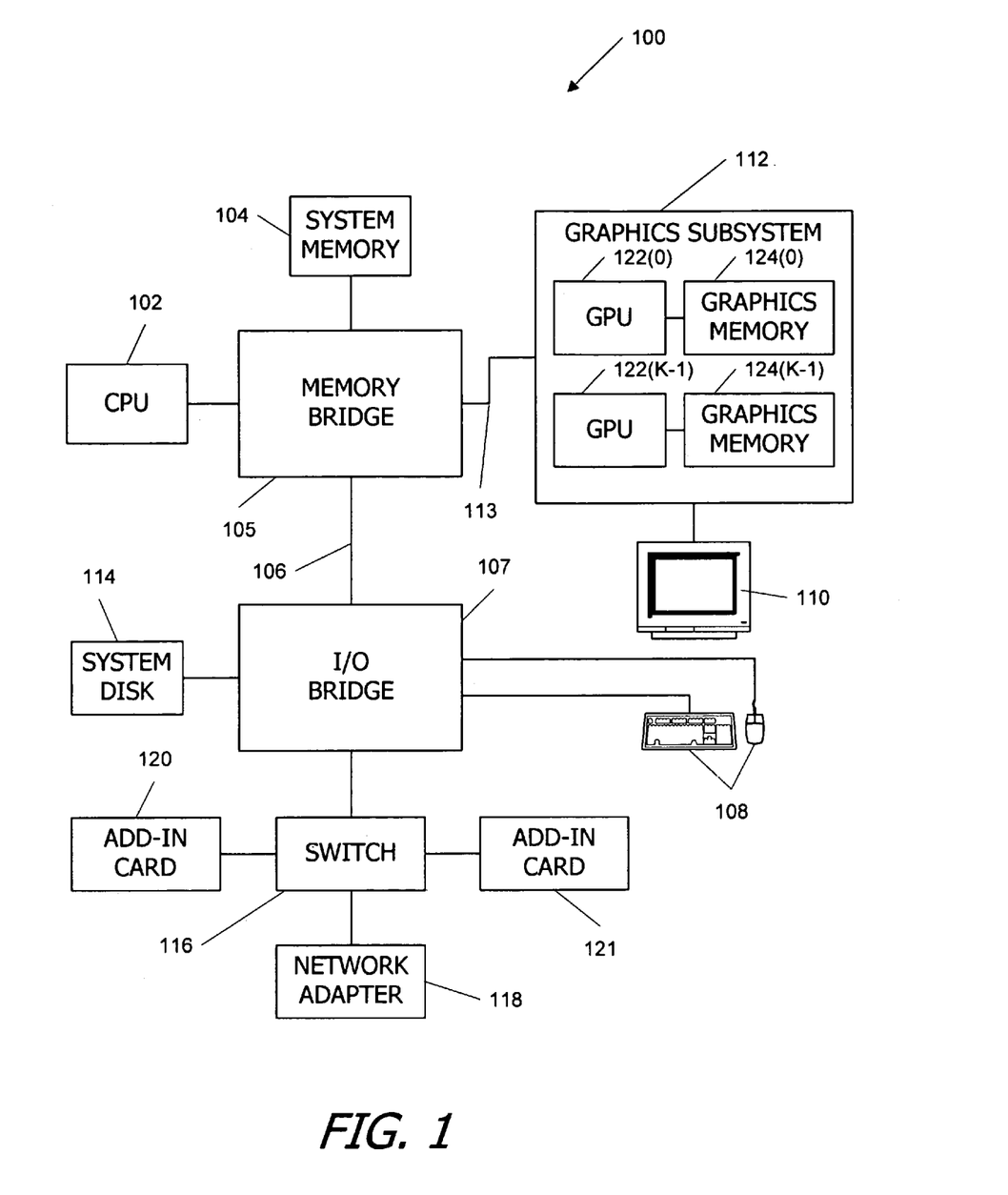
FIG. 1 is a simplified functional block diagram of an embodiment of a computer system.

FIG. 1 is a block diagram of a computer system 100 according to an embodiment of the invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 112 includes at least one graphics processing unit (GPU) 122 and associated graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 can also include a scanout module configured to deliver pixel data from graphics memory 124 to display device 110.

As shown in FIG. 1, the graphics processing subsystem 112 can include a plurality of K GPUs 122(0)-122(K−1). Each of the K GPUs 122(0)-122(K−1) can have associated graphics memory 124(0)-124(K−1). The graphics subsystem 112 can be implemented on a single graphics assembly coupled via the bus 113 to the memory bridge 105. Alternatively, the graphics subsystem 112 can be implemented on a plurality of distinct assemblies. For example, the graphics subsystem 112 can include two separate graphics cards. Each graphics card can include a GPU 122 and associated graphics memory 124. Each of the graphics cards can couple to the memory bridge 105 via the bus 113. The bus 113 can be a bus utilizing the PCI or PCI-E communication protocol or some other communications protocol.

In the embodiment in which each GPU 122 and associated graphics memory 124 is configured on a distinct assembly or card, the separate graphics cards can be peer devices. A first peer device can include a first GPU 122(0) and local graphics memory 124(0). Similarly, a second graphics card can include a second GPU 122(1) and local graphics memory 124(1). The two graphics cards can communicate over a common PCI-E bus, or some other communication bus.

CPU 102 operates as the master or host processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102.

The CPU 102 can be configured to concurrently execute a plurality of independent processes, each of which can share use of the system memory 104 and graphics subsystem 112. For example, the system memory 104 can store executable code or software for a plurality of independent processes, and the CPU 102 can concurrently access the system memory 104 to retrieve and execute the independent processes.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. A GPU may be provided with any amount of local graphics memory, including no local memory, and may use local memory and system memory in any combination.

As described above, any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the invention may be incorporated into a variety of devices, including general purpose computer systems, video game consoles and other special purpose computer systems, DVD players, handheld devices such as mobile phones or personal digital assistants, and so on.

As described above, the CPU 102 can be configured to concurrently execute a plurality of independent processes, each of which can use portions of system memory 104 and graphics memory 124. Each of the add-in cards 120, 121 can also execute a process, in conjunction or independent of the CPU 102, that uses a portion of system memory 104 or graphics memory 124.

Each of the independent processes can initiate a flush operation independent of any flush operation initiated by any other process. Software can be responsible for initiating and monitoring the flush operation when the flush operation is a related to resource management, such as updating a page table entry of a logical memory map or managing display resources.

The GPU 122 can be configured to perform a flush by initiating a read operation of at least one location each memory partition of the graphics memory 124 associated with the GPU 122. The GPU 122 can selectively initiate a read of system memory 104 and graphics memory 124 associated with any peer GPUs 122. The term "peer GPU" refers to GPU 122 and graphics memory 124 distinct from the GPU 122 and associated graphics memory 124 initiating the flush operation. In one embodiment, the GPU 122 can be configured to read from system memory 104 and the graphics memory 124 of a peer GPU 122 only if a write to that memory occurred since execution of the last flush operation.

The system 100 can be configured to complete all write operations prior to servicing a later issued read operation. Thus, the system 100 can be assured of having completed all write operations to a particular memory portion when a read from that portion of memory returns a value. The flush operation has completed when all of the reads initiated by the flush operation complete.

Rendering Pipeline Overview

Figure 2:
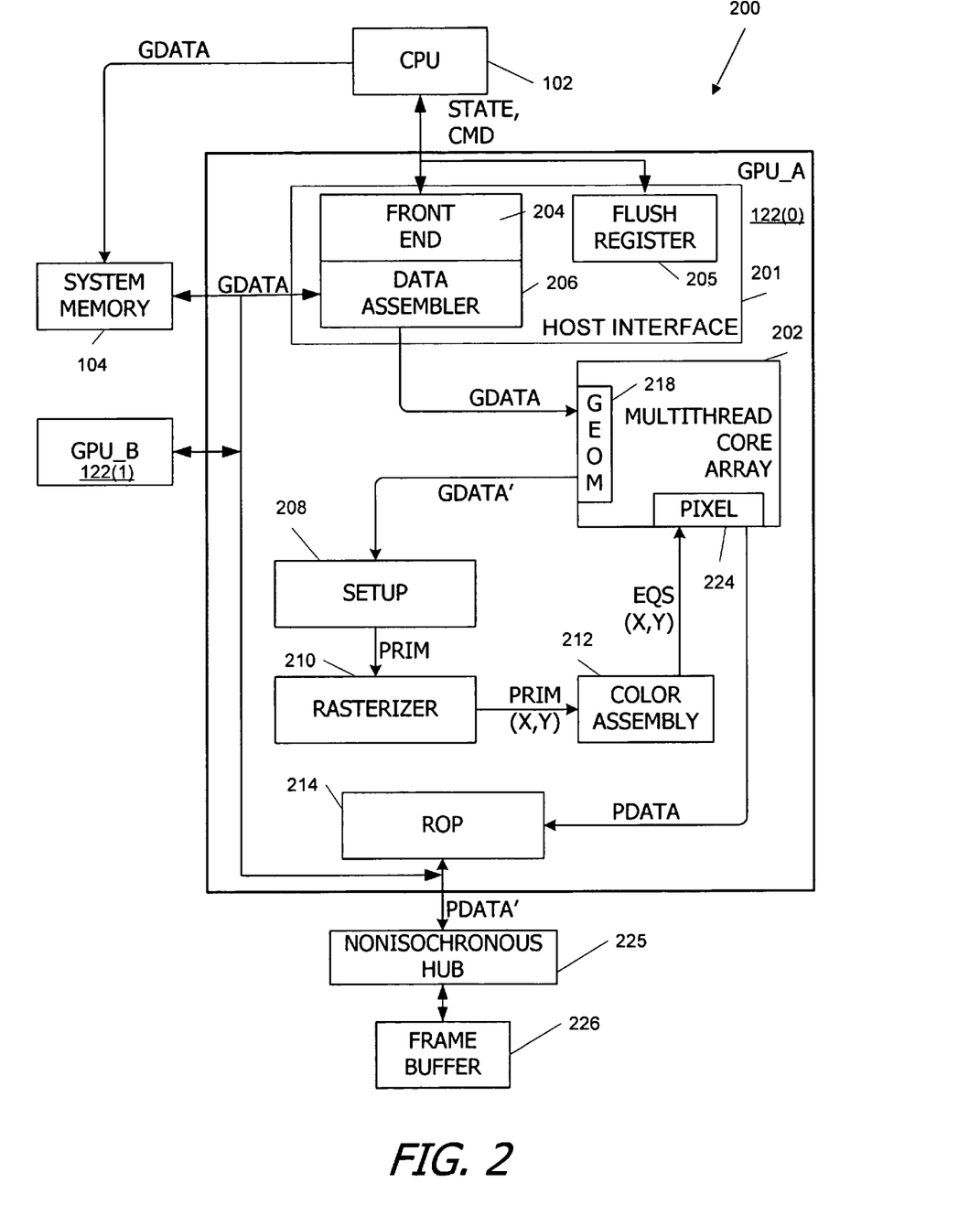
FIG. 2 is a simplified functional block diagram of a rendering pipeline.

FIG. 2 is a block diagram of a rendering pipeline 200 that can be implemented in GPU 122(0) of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes host interface block 201 having a front end 204, data assembler 206, and flush register 205. The rendering pipeline further includes a setup module 208, a rasterizer 210, a color assembly module 212, a raster operations module (ROP) 214, and a nonisochronous hub 225. Each of the blocks in the rendering pipeline 200 can be implemented using conventional integrated circuit technologies or other technologies.

The host interface block 201 provides the interface between the GPU 122(0) and external devices, such as a CPU 102 or a peer GPU 122(1). The host interface block 201 can be configured to determine which device was the source of an instruction. For example, the host interface block 201 can determine that an instruction originated at the CPU 102 or alternatively at a peer GPU 122(1).

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a vertex shader program to interpolate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. ROP 214 writes the pixel values to a nonisochronous hub 225 that is coupled to the frame buffer 226. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226 via the nonisochronous hub 225. The nonisochronous hub 225 can be configured to determine the location of memory for the pixel data. For example, the nonisochronous hub 225 can determine whether the memory locations are in system memory 104, graphics memory local to the GPU 122(0) or graphics memory local to a peer GPU 122(1). The nonisochronous hub 225 can also track the writes to the various memory partition in each of the storage devices, and in particular, can track the destination of data written or to be written. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Flush Operation

The GPU 122(0) includes a flush register 205 in the host interface block 201 that is coupled to the CPU 102 and any peer GPUs 122(1). The CPU 102, executing one or more software processes, can initiate a flush operation on behalf of a particular software operation. The CPU 102 writes to the flush register 205 to initiate the flush operation. A peer GPU 122(1) can initiate a flush operation of a fellow peer GPU 122(0) by writing to the flush register 205. The host interface block 201 within the GPU 122(0) can be configured to determine whether the flush operation originated from the CPU 102, as part of a host operation, or from a peer GPU 122(1).

If the GPU 122(0) determines that the flush operation originated from the CPU 102, the GPU 122(0) performs a flush operation that ensures coherency of all memory locations, including system memory 104 and graphics memory that is local to the GPU 122(0) as well as graphics memory that is local to any peer GPUs 122(1).

The GPU 122(0) can initiate a read of each memory portion in response to the flush. The memory read operations ensure that all writes to the memory locations have completed. The GPU 122(0) need not read all memory locations individually, but may only issue one read operation to each memory portion identified in a logical memory map. In some embodiments, the graphical memory may be partitioned into a predetermined number of partitions, and the GPU 122(0) may issue a read to a location within each of the memory partitions. In other embodiments, the GPU 122(0) may read a status register that indicates the completion of any pending write operations.

For example, the GPU 122(0) can issue a read operation to each portion of the system memory 104 identified in a logical memory map and can issue a read to each partition in local graphics memory, such as the frame buffer 226. The GPU 122(0) can also issue a read operation to each peer GPU 122(1). As will be described in detail below, the manner in which the GPU 122(0) reads from a peer GPU 122(1) may be accomplished by a series of write operations.

If the GPU 122(0) determines that the flush operation initiated from a peer GPU 122(1), the GPU 122(0) restricts the flush operation to a subset of all memory locations, such as local graphics memory. In one embodiment, the GPU 122(0) ensures that all write operations to local graphics memory complete, but does not ensure completion of write operations to other memory locations, such as system memory 104 and memory local to other peer devices, such as the peer GPU 122(1).

The system 100 can be configured such that a peer initiated write operation to the GPU 122(0) is restricted to a memory destination in the graphics memory local to the GPU 122(0). That is, if a peer GPU 122(1) writes to the local memory of the GPU 122(0) the system does not allow the destination of the write operation to be mapped to another memory location, such as in system memory 104. Therefore, a flush operation initiated on the GPU 122(0) by a peer GPU 122(1) need only ensure coherency of the local memory.

In another embodiment, the GPU 122(0) can ensure that write operations to local graphics memory as well as write operations to at least a portion of system memory 104 complete, but does not ensure that write operations to memory local to the peer GPU 122(0) complete. The portion of memory included in the flush operation can be predetermined, or can be dynamically determined using one or more programmable control settings. Thus, in this embodiment, the GPU 122(0) can be configured to initiate a local memory flush or a memory flush of a subset of all memory locations when the flush operation initiates at a peer device having local memory.

In another embodiment, the GPU 122(0) can receive flush initiation from a peer device (such as add in cards 120, 121 from FIG. 1) that is not a peer GPU 122(1). In such an embodiment, each GPU 122(0) and 122(1) can determine that a peer GPU did not initiate the flush operation. In this embodiment, the GPUs 122(0) and 122(1) can be configured to initiate a flush in the same manner as when the CPU 102 initiates the flush operation.

Figure 3:
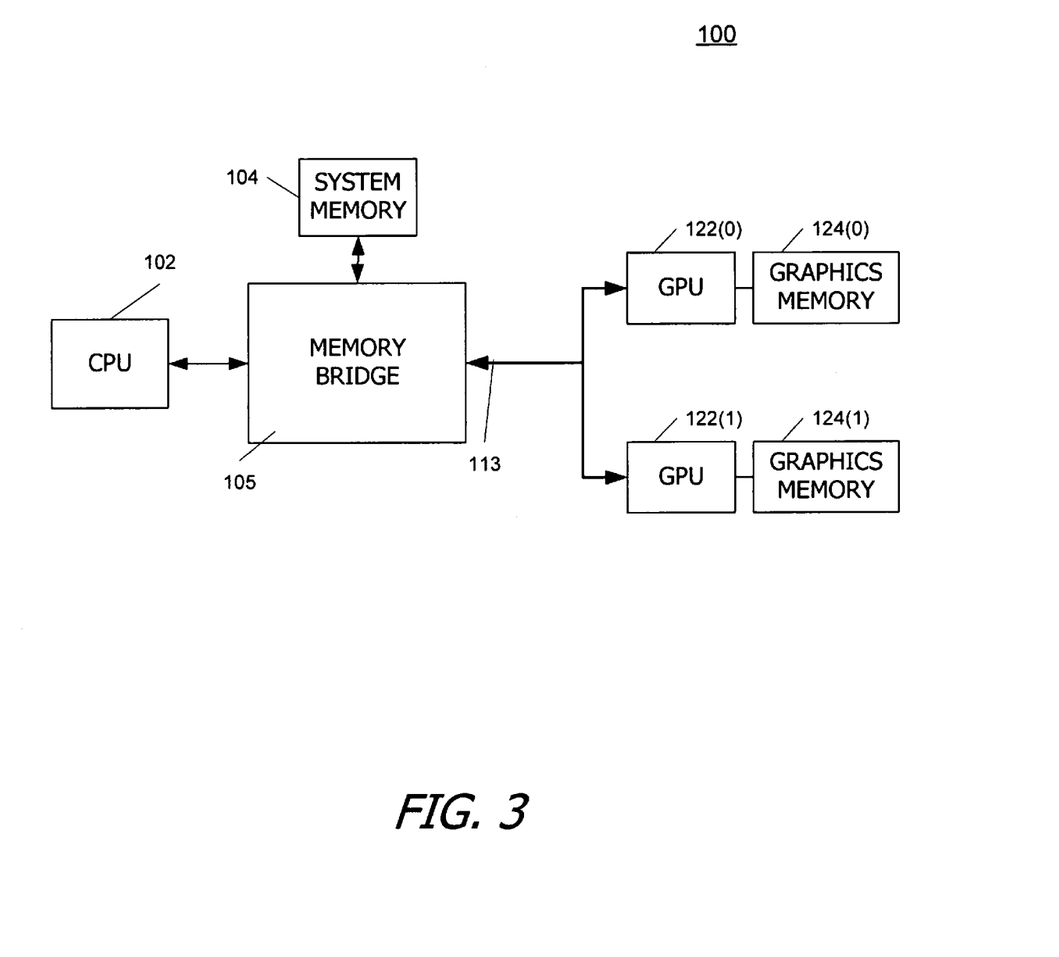
FIG. 3 is a simplified functional block diagram of an embodiment of a computer system having multiple peer devices.

FIG. 3 is a simplified functional block diagram of an embodiment of a computer system 100 having multiple peer devices. In the system 100, two peer GPUs 122(0) and 122(1) are coupled to a bus 113, such as a PCI-E bus, to a CPU 102 and system memory 104.

Each GPU 122(0) and 122(1) has associated local memory configured as graphics memory 124(0) and 124(1). As described above, each of the CPU 102 and GPUs 122(0) and 122(1) can initiate a flush operation.

For example, the CPU 102 can initiate a flush operation by writing to the flush register of one of the two peer GPUs 122(0) and 122(1). A first GPU 122(0) can initiate a flush of the second GPU 122(1) and the second GPU 122(1) can likewise initiate a flush of the first GPU 122(0).

As described above, if the first GPU 122(0) receives a flush initiated by the second peer GPU 122(1), it performs a flush operation of the local graphics memory 124(0). Similarly, if the second GPU 122(1) receives a flush initiated by the first peer GPU 122(0), it performs a flush operation of the local graphics memory 124(1).

In some embodiments, such as the embodiment in which the bus 113 is a PCI-E bus, the peer to peer communication protocol used by the peer GPUs 122(0) and 122(1) does not allow a peer to initiate read operations of the graphics memory 124(0) and 124(1) of the peer GPU. Thus, a first GPU 122(0) cannot initiate a read of the graphics memory 124(1) local to the second GPU 122(1) to ensure that the flush operation is complete.

Instead, the first GPU 122(0) can write a read request to the peer GPU 122(1) and once the peer GPU 122(1) completes the flush operation of its local graphics memory 124(1), the peer GPU 122(1) returns a write packet indicating a read completion. That is, the peer GPU 122(1) performing the local flush writes a read completion packet to the initiating GPU 122(0) to acknowledge the completion of the flush operation.

Figure 4:
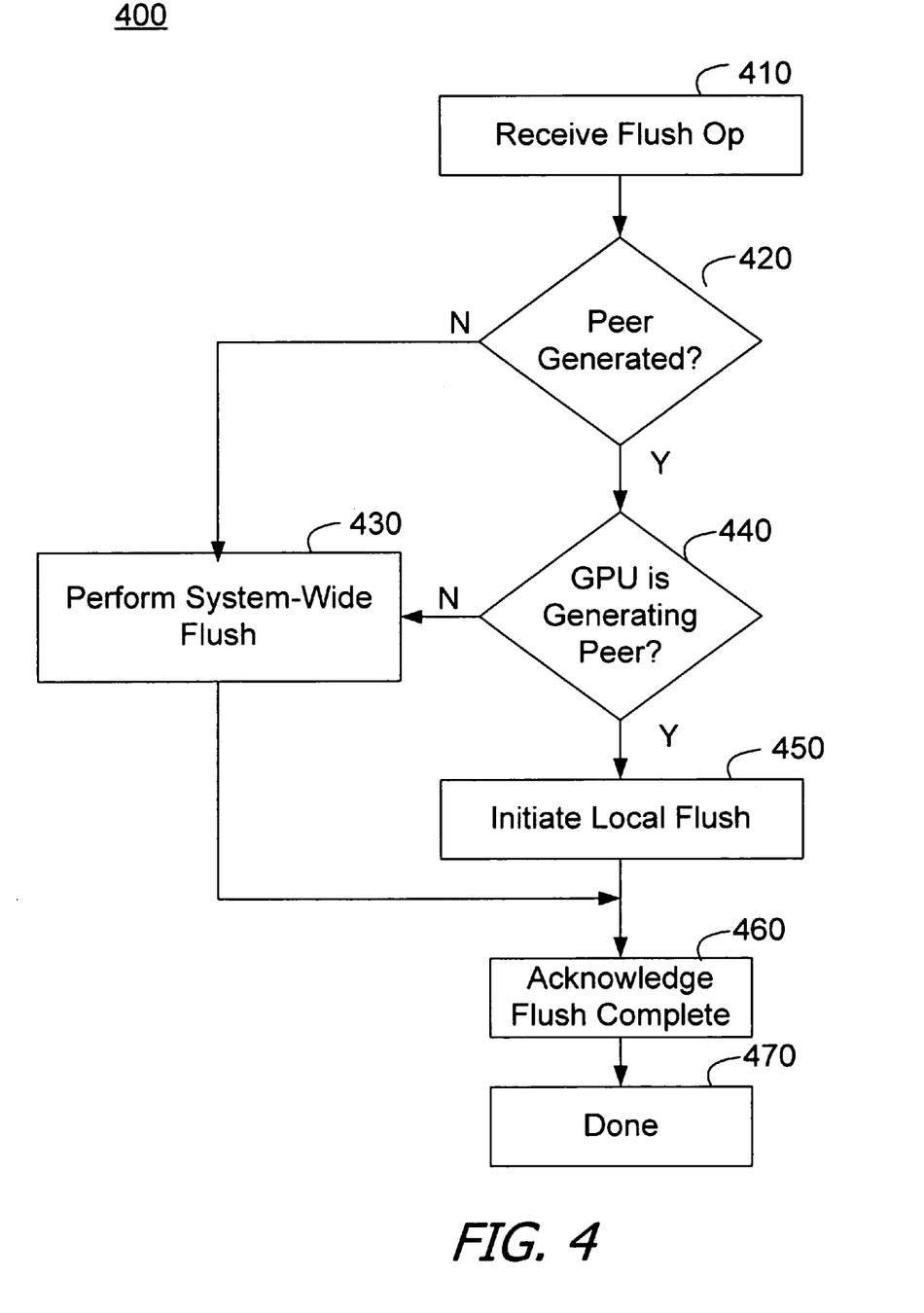
FIG. 4 is a simplified flowchart of an embodiment of a method of flushing memory for peer initiated flush operations.

FIG. 4 is a simplified flow chart of an embodiment of a method 400 of flushing memory for peer initiated flush operations. The method 400 can be performed, for example, by a GPU 122(0) of the system shown in FIG. 1.

The method 400 begins at block 410 when the GPU receives an instruction to initiate a flush operation. The various devices in a system can initiate a flush operation in a variety of ways. For example, a host process may initiate a flush operation by instructing the CPU to write to a flush register in the GPU. Alternatively, a peer GPU can initiate a flush by writing to the flush register of the GPU. In other embodiments, particular bus protocols may allow other devices to initiate a flush operation. For example, in the PCI-E bus protocol, a device can initiate a flush operation by writing a length 1 read with null byte enables to the host interface block of the GPU. The GPU interprets this particular write as a command to initiate a flush operation.

The GPU proceeds to decision block 420 upon receipt of a flush initiation command. At decision block 420, the GPU determines whether the flush operation initiated at a peer device. If not, the flush operation initiated at the host or CPU and the GPU proceeds to block 430 to perform a system wide flush of all memory. Upon completion of the flush operation, the GPU proceeds to block 460 and generates a flush complete acknowledgement. the GPU then proceeds to block 470 and the flush is done.

Returning to decision block 420, if the GPU determines that the flush operation initiated at a peer device, the GPU proceeds to decision block 440 to determine if the initiating peer is a peer GPU. If not, the flush operation is handled like a host initiated flush operation. The GPU proceeds to block 430 and performs a system wide flush of all memory. Upon completion of the flush operation, the GPU proceeds to block 460 and generates a flush complete acknowledgement. the GPU then proceeds to block 470 and the flush is done.

If, at decision block 440, the GPU determines that the flush operation initiated by a peer GPU, the GPU proceeds to block 450. At block 450, the GPU performs a flush of memory local to the GPU or some subset of the entire memory space. For example, the GPU can perform a flush operation on the local graphics memory.

After the local flush operation completes, the GPU proceeds to block 460 to generate a flush acknowledgement. In some embodiments, the GPU can allow a read to complete, where the read operation initiated after the flush command. In another embodiment, the GPU receives a write command for a read request from the peer GPU that initiated the flush operation. The GPU responds with a write to the initiating GPU. In one embodiment, the GPU performing the local flush returns a write packet indicating a read completion. After the GPU acknowledges the completion of the flush, the GPU proceeds to block 470 and the flush is done.

A hierarchical flush operation and method of performing a flush operation are described. The hierarchical flush operation allows a device to perform a flush based on whether the initiator or source of the flush command is a host or a peer. Host initiated flush operations flush the complete memory in the system, which peer initiated flush operations can result in a flush of a subset of all memory locations.

The various illustrative logical blocks, modules, and circuits described in connection with the embodiments disclosed herein may be implemented or performed with a general purpose processor, a graphics processing unit, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of performing memory flush operations in a system having at least one host device and a plurality of peer devices, the method comprising:
   receiving a flush command at a first peer device;
   determining whether a source of the flush command corresponds to a host device or a second peer device; and
   performing one of a plurality of flush operations on a subset of memory locations based at least in part on the determination of the source,
   wherein the first peer device performs the flush operation restricted to memory local to the first peer device if the source is determined to be the second peer device;
   wherein the first peer device comprises a first graphics processing unit coupled to a communications bus and the second peer device comprises a second graphics processing unit coupled to the communications bus.

2. The method of claim 1, wherein receiving the flush command comprises receiving a write to a flush register.

3. The method of claim 1, wherein determining the source of the flush command comprises determining whether a host process initiated the flush command.

4. The method of claim 1, wherein determining the source of the flush command comprises determining whether a CPU initiated the flush command.

5. The method of claim 1, wherein determining the source of the flush command comprises determining whether a peer device initiated a write to a flush register.

6. A method of performing memory flush operations in a system having a host device and a plurality of peer devices, the method comprising:
   receiving a flush operation command at a first peer device;
   determining whether the flush operation command initiated at a second peer device;
   initiating a memory flush of a subset of available memory locations if the flush operation command initiated in the second peer device,
   wherein initiating the memory flush includes initiating one of a plurality of memory flush mechanisms based at least in part on the determination whether the flush operation command initiated at the second peer device,
   wherein the first peer device performs the flush operation restricted to memory local to the first peer device if the flush command is determined to be initiated at the second peer device; and
   acknowledging completion of the memory flush,
   wherein the first peer device comprises a first graphics processing unit coupled to a communications bus and the second peer device comprises a second graphics processing unit coupled to the communications bus.

7. The method of claim 6, wherein the peer device comprises a peer device having associated local memory.

8. The method of claim 6, wherein acknowledging completion of the memory flush comprises generating a write of a read completion packet.

9. The method of claim 6, wherein acknowledging completion of the memory flush comprises generating a write of a read completion packet to the initiating peer device.

10. The method of claim 6, wherein receiving the flush operation command comprises receiving a write to a flush register from the second peer device.

11. A system having a plurality of memory flush mechanisms, the system comprising:
   a host device configured to selectively generate a host flush command;
   a first peer device configured to selectively generate a peer flush command; and
   a second peer device configured to receive a flush command, determine if a source of the flush command corresponds to the host device or the first peer device, and initiate one of the plurality of memory flush mechanisms based at least in part on the determination of the source;
   wherein the second peer device performs a flush operation restricted to memory local to the second peer device if the source is determined to be the first peer device;
   wherein the first peer device comprises a first graphics processing unit coupled to a communications bus and the second peer device comprises a second graphics processing unit coupled to the communications bus.

* * * * *